(12) United States Patent
Sosnowski et al.

(10) Patent No.: US 9,580,001 B2
(45) Date of Patent: Feb. 28, 2017

(54) SIDE SHIELD TRENCH ON SEAT CUSHION

(71) Applicant: Toyota Motor Engineering & Manufacturing North America, Inc., Erlanger, KY (US)

(72) Inventors: Yi-Ru Chen Sosnowski, Ann Arbor, MI (US); Robert Joseph Hazlewood, Plymouth, MI (US); Patrick J. Edgar, Ann Arbor, MI (US); Kyle E. Rosander, Ann Arbor, MI (US); Leon Toma, Commerce Township, MI (US)

(73) Assignee: Toyota Motor Engineering & Manuufacturing North America, Inc., Erlanger, KY (US)

( * ) Notice: Subject to any disclaimer, the term of this patent is extended or adjusted under 35 U.S.C. 154(b) by 39 days.

(21) Appl. No.: 14/518,508

(22) Filed: Oct. 20, 2014

(65) Prior Publication Data

US 2016/0107556 A1 Apr. 21, 2016

(51) Int. Cl.
| | |
|---|---|
| *A47C 7/02* | (2006.01) |
| *B60N 2/70* | (2006.01) |
| *B60N 2/64* | (2006.01) |
| *B60N 2/58* | (2006.01) |
| *B60N 2/68* | (2006.01) |
| *B60N 2/60* | (2006.01) |

(52) U.S. Cl.
CPC ............... *B60N 2/70* (2013.01); *B60N 2/58* (2013.01); *B60N 2/5816* (2013.01); *B60N 2/6009* (2013.01); *B60N 2/646* (2013.01); *B60N 2/682* (2013.01); *B60N 2/7017* (2013.01)

(58) Field of Classification Search
CPC ............ A47C 7/40; A47C 7/185; A47C 7/002
USPC .......................... 297/452.38, 452.55, 463.1
See application file for complete search history.

(56) References Cited

U.S. PATENT DOCUMENTS

| 113,835 | A | | 4/1871 | Barton |
|---|---|---|---|---|
| 2,669,294 | A | | 2/1954 | Burdick |
| 4,880,276 | A | | 11/1989 | Shovar |
| 4,973,105 | A | * | 11/1990 | Itou .................. B60N 2/161 |
| | | | | 297/218.1 |

(Continued)

*Primary Examiner* — David R Dunn
*Assistant Examiner* — Alexander Harrison
(74) *Attorney, Agent, or Firm* — Dinsmore & Shohl LLP

(57) ABSTRACT

A seat assembly is provided having a side shield having a leading edge. The side shield adapted to cover at least a portion of the seat cushion of the seat assembly. The assembly further includes a seat cushion, the side shield positioned adjacent to the seat cushion, the seat cushion having an elongated trench adapted to receive the leading edge of the side shield so as to prevent the formation of a gap between the shield and the cushion portion thereby providing an aesthetically appealing appearance to the user. The seat cushion includes a side surface positioned adjacent to the side shield. The trench is further defined as a generally horizontal momentary discontinuous surface extending into the side surface of the seat cushion, the leading edge of the side shield resting within the trench. The side shield extends around the seat cushion to a front portion of the seat cushion and the trench adapted to accept the leading edge of the side shield at the front portion of the seat cushion. The trench further extends horizontally from the rear to the front of the seat cushion to accommodate the leading edge of the side shield.

20 Claims, 3 Drawing Sheets

(56) References Cited

U.S. PATENT DOCUMENTS

| | | | | |
|---|---|---|---|---|
| 5,007,682 A | * | 4/1991 | Kuwabara | B60N 2/44 297/452.38 |
| 5,228,659 A | | 7/1993 | Potes, Jr. et al. | |
| 5,288,133 A | | 2/1994 | Mizushima et al. | |
| 6,149,241 A | * | 11/2000 | Waku | B60N 2/015 297/452.38 |
| 7,104,570 B2 | | 9/2006 | Hearn et al. | |
| 7,237,846 B1 | * | 7/2007 | Arima | B60N 2/6009 297/452.18 |
| 7,850,247 B2 | | 12/2010 | Stauske et al. | |
| 8,678,507 B2 | | 3/2014 | Yamazaki et al. | |
| 2009/0066142 A1 | * | 3/2009 | Ventura | B29C 44/12 297/452.26 |
| 2009/0146485 A1 | * | 6/2009 | Inagaki | B60N 2/0224 297/463.1 |
| 2010/0072804 A1 | * | 3/2010 | Stauske | B60N 2/5621 297/452.38 |
| 2012/0169101 A1 | * | 7/2012 | Suzuki | B60N 2/12 297/354.1 |
| 2012/0313408 A1 | | 12/2012 | Nagata et al. | |
| 2013/0057035 A1 | | 3/2013 | Nishiura et al. | |
| 2013/0257129 A1 | | 10/2013 | Guarneros et al. | |

* cited by examiner

SIDE SHIELD TRENCH ON SEAT CUSHION

FIELD OF THE INVENTION

The present invention relates generally to seat assemblies. More particularly, the present invention relates to a seat assembly having a side shield with an aesthetically pleasing appearance.

BACKGROUND OF THE INVENTION

Seat assemblies having a side shield are well known in the art. Side shields are used to provide an aesthetically appealing appearance to the user and to also provide a barrier from the inside and underneath components of the seat assembly. The side shield may also hold the operator controls for the seat assembly, such as seat movement, slide, tilt, memory, recline . . . etc. However, current seat assembly configurations do not provide for a close mating condition between the side shield and the seat cushion. The prior art, such as illustrated in FIGS. 1 and 2, show a large gap between the leading edge of the side shield and the seat cushion. This gap is not only not aesthetically pleasing, it also may result in objects dropped by the user becoming lost by falling through the gap and the side shield and creates an inconsistent gap. Accordingly, there exists a need in the art to provide a seat assembly having a side shield having an improved mating condition between the leading edge of the side shield and the seat cushion.

SUMMARY OF THE INVENTION

The present assembly provides for a seat assembly having an aesthetically pleasing trim appearance close out, i.e. eliminating the gap, between the side shield and the seat cushion. An elongated trench is configured along the side edge (generally parallel) of the seat cushion and is adapted to receive a leading edge of the side shield thus eliminating any gap between the side shield and the seat cushion.

A seat assembly is provided having a side shield includes a thin walled body and an inwardly directed leading edge. The side shield adapted to cover at least a portion of the seat cushion. The assembly further includes a seat cushion, the side shield positioned adjacent to the seat cushion, the seat cushion having an elongated trench adapted to receive the leading edge of the side shield so as to prevent the formation of a gap between the shield and the cushion portion thereby providing an aesthetically appealing appearance to the user and to absorb variation into the assembly. The seat cushion includes a side surface positioned adjacent to the side shield. The trench is further defined as a generally horizontal momentary discontinuous surface extending into the side surface of the seat cushion, the leading edge of the side shield resting within the trench. The side shield extends around the seat cushion to a front portion of the seat cushion and the trench adapted to accept the leading edge of the side shield at the front portion of the seat cushion. The trench further extends horizontally from the rear to the front of the seat cushion to accommodate the leading edge of the side shield.

The assembly further provides for improved installation of the side shield by providing a guide to the installer. Although the trench is not viewable to the installer since it is covered by material, the installer could feel for the trench and use it as a guide during installation. The assembly further minimizes deformation of the side shield over the life of the vehicle by not placing excess stress on the side shield. The trench extends along the side of the seat cushion and allows the side shield to have a snug fit with the seat cushion. A trim cover, such as leather, vinyl, or cloth, is also placed over the seat cushion and positioned between the side shield and the seat cushion. This assembly results in a robust close out between the seat cushion and the side shield which is aesthetically appealing to the customer.

The side trench may also aid in installation of the side shield in the assembly process since it ensures that the side shield is installed in the correct manner. Although the trench is a secondary check (the assembly team guides the shield into place by use of clips, screws and other features on the seat frame), it still assists in the overall installation of the assembly. Placement of the leading edge of the side shield in the trench also helps maintain the integrity of the side shield and prevents deformation of the side shield over time.

DETAILED DESCRIPTION OF THE INVENTION

The present seat assembly 10 includes a seat cushion with a trench that receives a side shield. The seat assembly 10 for a structure having an aesthetically appealing appearance to the customer by closing out the gap between the side shield and the seat cushion of a seat assembly. An elongated and generally horizontally extending trench is provided within the seat cushion and adapted to accept a parallel leading edge of the side shield. The seat cushion includes a side surface with an inward contoured formation.

A trench is provided resulting in in a momentary change in the surface contour of the seat cushion's side surface. The trench is adapted to receive a leading edge of the side shield. The side shield extends from the trench outward. When the trench and the leading edge of the side shield align, an aesthetically appealing transition from the cushion to the side shield is formed. The improved mating condition of the cushion and the side shield also improves the side shield installation, helps maintain the integrity of the side shield, and helps prevent deformation of the side shield over time.

Figure 1:
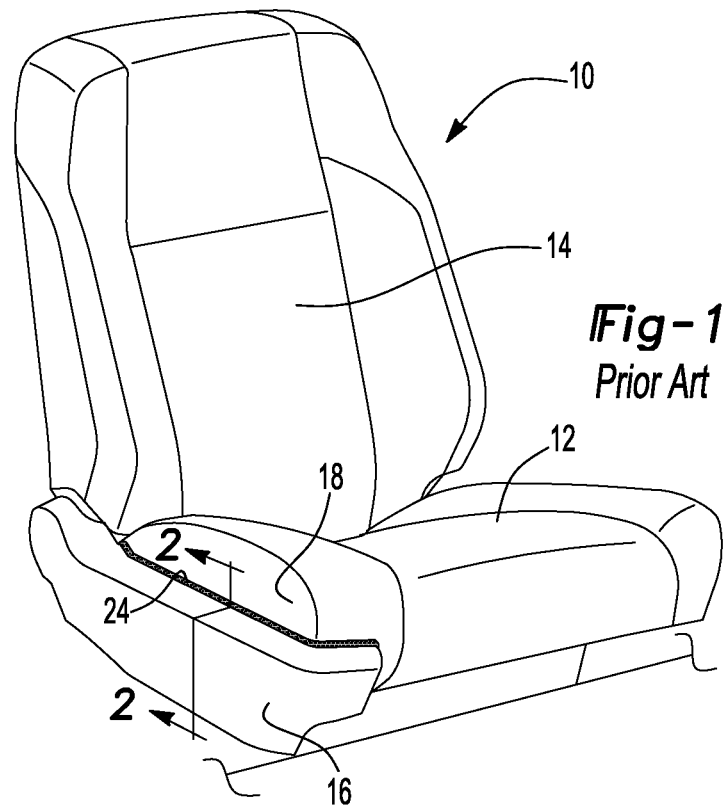
FIG. 1 illustrates a perspective view of a seat assembly of the Prior Art.
Figure 2:
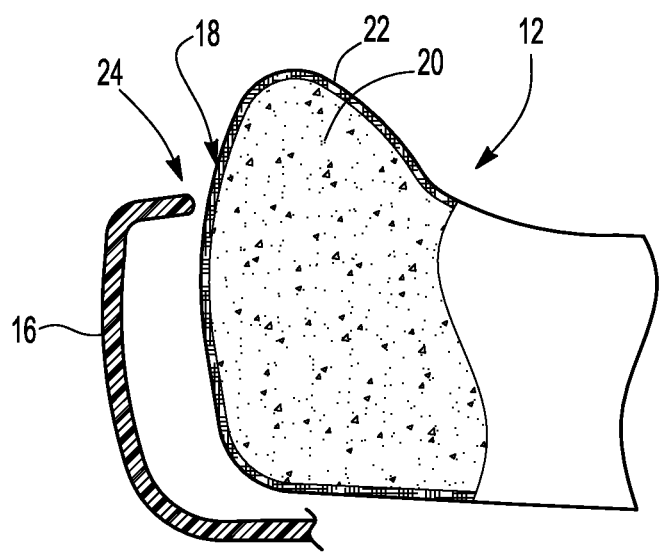
FIG. 2 illustrates a cross-sectional view along the line 2-2 of FIG. 1 illustrating the gap created in the Prior Art.
Figure 3:
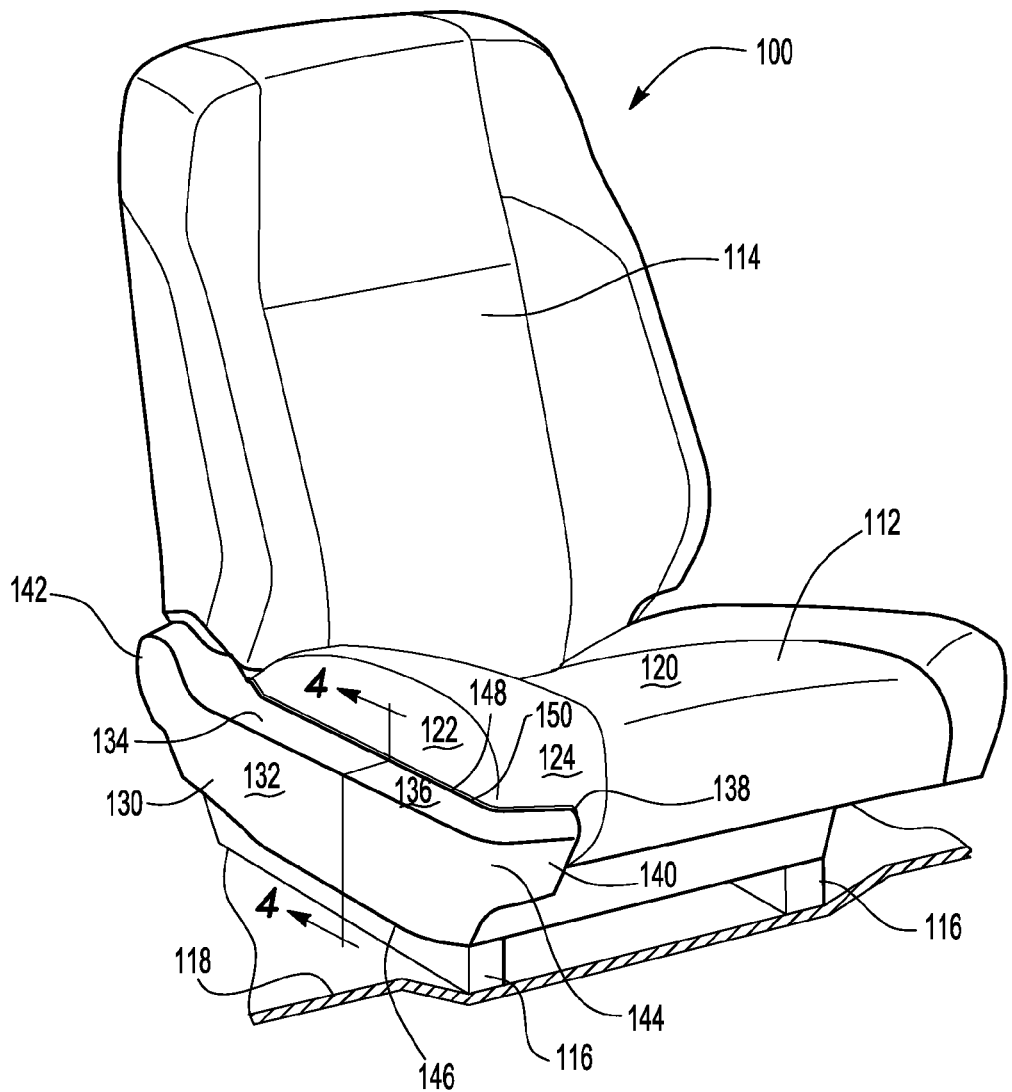
FIG. 3 illustrates a perspective view of the side shield having no gap between the side shield and the seat cushion having a trench.
Figure 4:
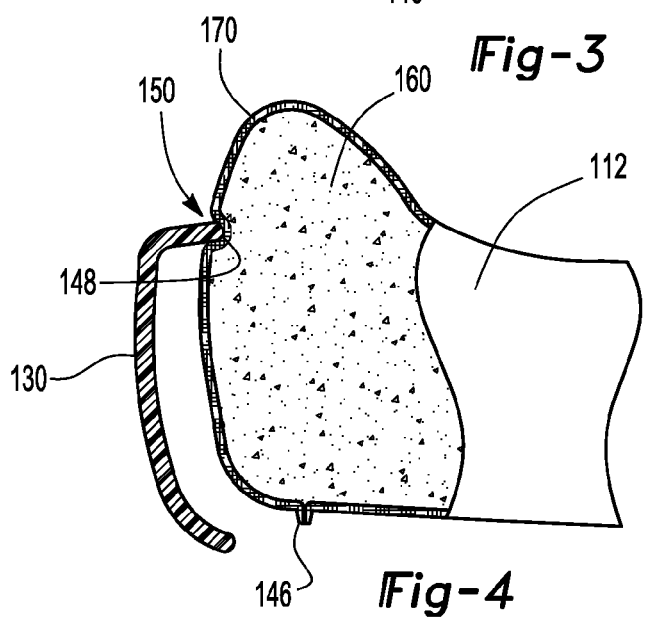
FIG. 4 illustrates a cross-sectional view along the line 4-4 as illustrated in FIG. 3 illustrating the trench within the seat cushion.

FIGS. 1 and 2 illustrate the prior art requiring improvement. A seat assembly 10 of the prior art includes a seat cushion 12 and a back portion 14. A side shield 16 is also provided. The seat cushion 12 includes an outer side 18. As illustrated in FIGS. 1 and 2 of the prior art, a large gap 24 is provided between the side shield 16 and the outer surface 18 of the seat cushion 12 of the seat assembly 10. The seat cushion 12 includes a foam interior 20 and an optional trim cover 22. The gap 24 as illustrated in FIG. 2 is not aesthetically pleasing and has poor craftsmanship thus mandating the improvement as enumerated below and in the appended claims.

FIGS. 3-6 illustrate an improvement over the prior art by incorporating a trench resulting in an improved mating condition between the side shield and the seat cushion. Now referring to FIGS. 3-6. The seat assembly 100 includes a seat cushion 112 and a seat back 114. The seat cushion 112 and the seat back 114 are generally comprised of a cushion or cushion like foam material to provide comfort to the user. The seat cushion 112 may be provided over a wire frame to provide structure to the seat. The seat assembly 100 is attached to a frame 116. The seat frame 116 is mounted to a vehicle floor 118.

The seat cushion 112 includes an upper surface 120, a side surface 122, and a curved surface 124. The upper surface 120 of the seat cushion 112 is the area for which the user sits. The side surface 122, or side surface 122, is positioned on a lower outer portion of the seat assembly 100. The curved surface 124 of the seat assembly 100 is located at a forward position on the seat cushion 112.

The side shield 130 (also referred to as the base portion of the side shield) is provided having an outer surface 132 and an upper portion 134. The side shield 130 includes the outer surface 132 which is generally planar, contoured and styled and extends up to the upper portion 134. The upper portion 134 includes an upper surface 136. The side shield 130 further includes a front edge 138 adapted to connect with the curved surface 124 of the seat cushion 112. The front edge 138 is positioned near the front portion 140 of the side shield 130. The front portion 140 of the side shield 130 extends around to the curved surface 124 of the seat cushion 112.

The side shield 130 further includes a rear portion 142. The rear portion 142 is provided towards the rear of the seat assembly 100 and positioned adjacent to the seat back 114.

The side shield 130 further includes curved portion 144 extending to the front portion 140 of the side shield 130. The curved portion 144 of the side shield 130 is adapted to connect with the curved surface 124 of the seat cushion 112. The curved portion 144 is generally a smooth curve but may be a sharp corner based on customer demand and styling.

The side shield 130 further includes a lower edge 146 adapted to connect to the seat frame 116. The lower edge 146 of the side shield 130 may include bolts, screws and/or clips or other attachments to allow the side shield 130 to connect directly to the frame 116.

The side shield 130 further includes a leading edge 148 (or elongated leading edge). The leading edge 148 is adapted to connect with and rest within a trench 150 (or elongated trench) of the seat cushion 112. The trench 150 is a generally curved out portion within the seat cushion 112. The trench 150 may be permanently molded into the seat cushion as being a part of the die or mold or may be permanently cut out of the cushion after the molding process. The leading edge 148 of the side shield 130 is adapted to rest within the trench 150 to close out the space between the side shield 130 and the seat cushion 112 to eliminate the gap to provide superior craftsmanship and an aesthetically appealing appearance to customers.

The trench 150 includes a rear end 180 and a front end 182. The trench 150 generally extends over the side surface 122 of the seat cushion 112 between the rear end 180 and the front end 182 of the trench 150. The trench 150 is parallel to the shield by may be generally curved and is generally a half circle portion, in other embodiments. In other embodiments the trench 150 may be square, triangular, oval, rectangular, or even a slit to accommodate the leading edge 148 of the side shield 130. The trench 150 ranges between 1-6 centimeters in width with a depth of 0.25-4 centimeters. The length may span the entire length of the side surface of the seat portion.

Figure 5:
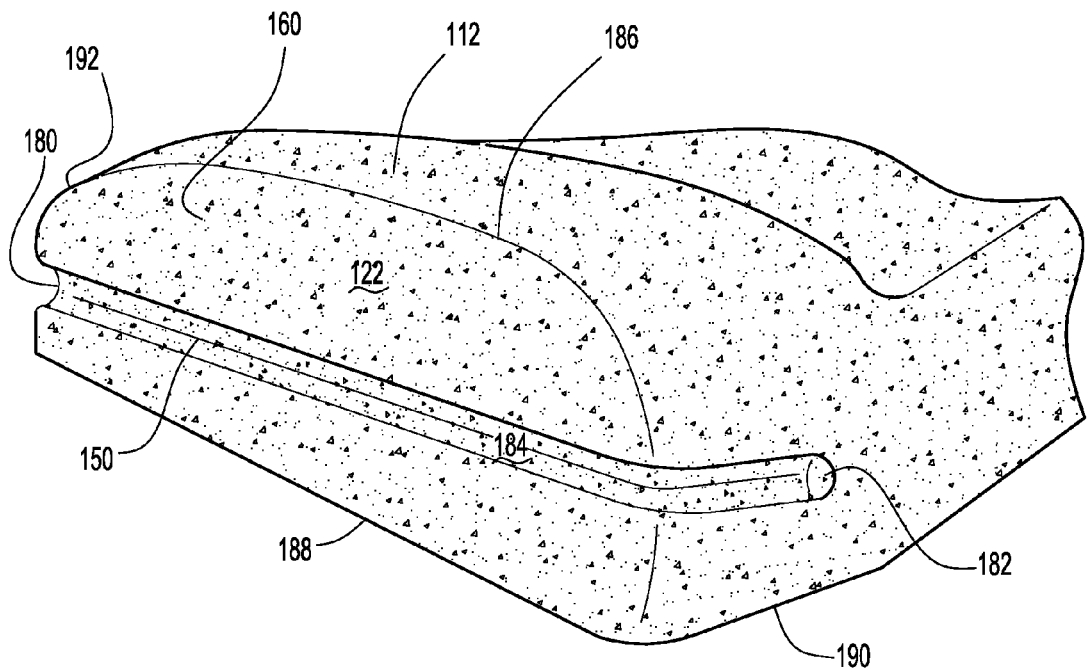
FIG. 5 illustrates a perspective side view of the seat cushion having a generally horizontal trench extending from the rear of the seat cushion to the front of the seat cushion.

FIG. 5 illustrates the seat cushion 112 without a trim cover 170. The trim cover 170 is positioned around a foam material 160 and within the trench 150. The trim cover 170 may be a cloth, leather, vinyl, plastic, plastic like, or a polymer material. Other known trim covers in the art may also be used. The trim cover 170 extends into the trench 150 to mimic the curvature of the trench 150. The leading edge 148 of the side shield 130 is then positioned within the trench 150.

In the present embodiment, the leading edge 148 of the side shield 130 is contoured to match the curvature of the trench 150. In other embodiments, the side shield 130 may have different geometry as compared to the trench 150.

The trench 150 includes an inner surface 184 contoured to mimic the leading edge 148 of the side shield 130. In the present embodiment, the inner surface 184 is generally rounded to accommodate the rounded portion of the leading edge 148 of the side shield 130.

The side surface 122 of the seat cushion 112 extends between an upper edge 186 and a lower edge 188. The trim cover 170 is adapted to wrap around the upper edge 186 and the lower edge 188 and connect to an area adjacent to the lower edge 188 of the seat cushion 112.

The seat cushion 112 further includes a front edge 190 and a rear edge 192. The trench 150 generally extends horizontally between the front edge 190 and the rear edge 192. As illustrated in FIG. 5, the trench 150 extends from a rear portion 142 of the seat cushion 112 and curves around to a front portion 140 of the seat cushion 112.

Figure 6:
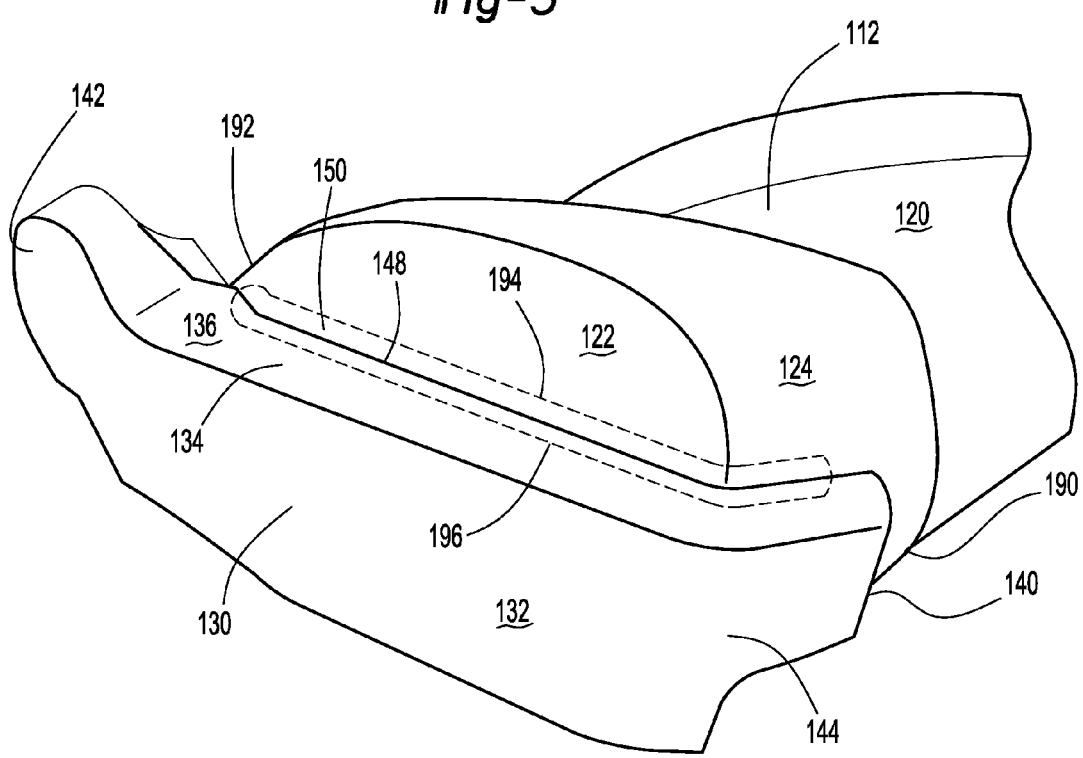
FIG. 6 illustrates a perspective view of an installed side shield illustrating the improved mating condition between the side shield and the seat cushion by using the trench.

FIG. 6 illustrates the trench 150 in an installed position. The leading edge 148 of the side shield 130 is positioned within the trench 150. The trench 150 of FIG. 6 is illustrated slightly in phantom to illustrate where exactly the trench 150 is located on the seat cushion 112 in an installed position. The trench 150 has an upper edge 194 and a lower edge 196 positioned on the side surface 122 and the curved surface 124 of the seat cushion 112.

The trench 150 is generally horizontally extending to accommodate the side shield 130. The trench 150 may be adapted to accommodate various side shields. The trench 150 is generally 10-30 millimeters in width measured between the upper edge 194 and the lower edge 196 of the trench 150 and generally 3-15 mm in depth.

To summarize, in one embodiment, a seat assembly 10 is provided having a side shield 130 having a leading edge 148. The side shield 130 adapted to cover at least a portion of the seat cushion 112 of the seat assembly 10. The assembly further includes a seat cushion 112, the side shield 130 positioned adjacent to the seat cushion 112, the seat cushion 112 having an elongated trench 150 adapted to receive the leading edge 148 of the side shield 130 so as to prevent the formation of a gap 24 between the shield and the cushion portion thereby providing an aesthetically appealing appearance to the user. The seat cushion 112 includes a side surface 122 positioned adjacent to the side shield 130. The trench 150 is further defined as a generally horizontal momentary discontinuous surface extending into the side surface 122 of the seat cushion 112, the leading edge 148 of the side shield 130 resting within the trench 150. The side shield 130 extends around the seat cushion 112 to a front portion 140 of the seat cushion 112 and the trench 150 adapted to accept the leading edge 148 of the side shield 130 at the front portion 140 of the seat cushion 112. The trench 150 further extends horizontally from the rear to the front of the seat cushion 112 to accommodate the leading edge 148 of the side shield 130. The side shield 130 includes an upper portion 134 extending away from a base portion, the leading edge 148 of the side shield 130 is positioned on the upper portion 134 of the side shield 130. A trim cover 170 is provided extending over and around the seat cushion 112, the trim cover 170 molded is into the trench 150. In one embodiment, the side shield 130 is connected to a frame 116, the frame 116 is connected to a floor of a vehicle.

In another configuration, a seat assembly 10 for use in an automotive vehicle is provided. The seat assembly 10 includes a frame 116, a side shield 130 having an elongated leading edge 148 and a lower edge 146 connected to the frame 116. A seat cushion 112 is also provided having a horizontally extending trench 150 positioned on the side of the seat cushion 112. The trench 150 extends from the rear to the front of the cushion portion wherein an aesthetically appealing transition from the seat cushion 112 to the side shield 130 with no gap 24 is formed when the trench 150 and the leading edge 148 of the side shield 130 align. The side shield 130 extends around the seat cushion 112 to a front portion 140 of the seat cushion 112. The trench 150 also extends around the seat cushion 112 to the front portion 140 of the seat cushion 112, the trench 150 is adapted to accept the leading edge 148 of the side shield 130 at the front portion 140 of the seat cushion 112. The trench 150 extends horizontally from the rear to the front of the seat cushion 112. The side shield 130 includes an upper portion 134 extending away from a base portion. The leading edge 148 of the side shield 130 is positioned on the upper portion 134 of the side shield 130. The trench 150 is further defined as a generally horizontal momentary discontinuous surface extending into the side surface 122 of the seat cushion 112, the leading edge 148 of the side shield 130 resting within the trench 150.

In a general sense, the present seat assembly 10 configuration may be used broadly with any seat cushion 112 portion (such as a seat cushion 112, cushion back, armrest cushion, bolster portion, side member portion . . . etc. or any other cushion portion have a shield portion). In this broad interpretation, the assembly includes a cushion portion having a first surface where the cushion portion having a trench 150 molded into the cushion portion. The assembly further includes a shield portion where the shield portion has a leading edge 148. The leading edge 148 of the shield adapted to be received within the trench 150 of the cushion portion thereby eliminating the gap 24 between the shield portion and the cushion portion to provide an aesthetically appealing appearance to the user and to aid in installation of the shield during manufacturing. In one embodiment, the trench 150 is generally horizontally extending. Further, the trench 150 may extend between a front portion 140 and a rear portion 142 of the seat assembly 10.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the appended claims.

ELEMENT LIST 10 seat assembly (8)
12 seat cushion (4)
14 back portion
16 side shield (2)
18 outer surface
22 optional trim cover
24 large gap
100 seat assembly (5)
112 seat cushion (44)
116 frame (6)
118 vehicle floor
120 upper surface (2)
122 side surface (9)
124 curved surface (6)
130 side shield (44)
132 outer surface (2)
134 upper portion (7)
136 upper surface
138 front edge (2)
140 front portion (10)
142 rear portion (4)
144 curved portion (3)
146 lower edge (3)
148 leading edge (20)
150 trench (44)
160 foam material
170 trim cover (7)
180 rear end (2)
182 front end (2)
186 inner surface (2)
188 lower edge (3)
190 front edge (2)
192 rear edge (2)
194 upper edge (2)
196 lower edge (2)

The invention claimed is:

1. A seat assembly having a seat frame, the seat assembly comprising:
a side shield, the side shield having an upper portion and an opposite bottom portion, the upper portion having a leading edge, the bottom portion attached to the seat frame, the side shield adapted to cover at least a portion of the seat cushion; and
a seat cushion having an elongated trench extending along a side edge thereof and which is adapted to receive the leading edge of the side shield, the trench permanently formed into the seat cushion, the trench curving to extend at least partially around to a front edge of the seat cushion, the front edge of the seat cushion being generally orthogonal from the side edge, the trench preventing the formation of a gap between the side shield and the seat cushion thus providing an aesthetically appealing appearance to the user.

2. The seat assembly of claim 1 wherein the seat cushion includes a side surface positioned adjacent to the side shield.

3. The seat assembly of claim 2 wherein the trench is further defined as a generally horizontal momentary discontinuous surface extending into the side surface of the seat cushion, the leading edge of the side shield resting within the trench.

4. The seat assembly of claim 1 wherein the side shield extend around the seat cushion to a front portion of the seat cushion.

5. The seat assembly of claim 2 wherein the trench extends around the seat cushion to the front portion of the seat cushion, the trench adapted to accept the leading edge of the side shield at the front portion of the seat cushion.

6. The seat assembly of claim 1 wherein the trench extends horizontally from the rear to the front of the seat cushion.

7. The seat assembly of claim 1 wherein the upper portion extends away from a base portion, the leading edge of the side shield is positioned on the upper portion of the side shield.

8. The seat assembly of claim 1 wherein a trim cover is provided extending over and around the seat cushion, the trim cover molded into the trench.

9. The seat assembly of claim 1 wherein the frame is connected to a floor of a vehicle.

10. A seat assembly for use in an automotive vehicle, the seat assembly including a frame, the seat assembly comprising:
   a side shield, the side shield having thin walled body including an uppermost and inwardly directed leading edge, the side shield having a lower edge connected to the frame; and
   a seat cushion, the seat cushion having a horizontally extending trench positioned on the side of the seat cushion, the trench permanently molded or cut into the seat cushion, the trench extending from the rear around to the front of the seat cushion wherein an aesthetically appealing transition from the seat cushion to the side shield with no gap is formed when the trench and the leading edge of the side shield align.

11. The seat assembly of claim 10 wherein the side shield extend around the seat cushion to a front portion of the seat cushion.

12. The seat assembly of claim 11 wherein the trench extends around the seat cushion to the front portion of the seat cushion, the trench adapted to accept the leading edge of the side shield at the front portion of the seat cushion.

13. The seat assembly of claim 10 wherein the trench extends horizontally from the rear to the front of the seat cushion.

14. The seat assembly of claim 10 wherein the side shield includes an upper portion extending away from a base portion.

15. The seat assembly of claim 14 wherein the leading edge of the side shield is positioned on the upper portion of the side shield.

16. The seat assembly of claim 10 wherein the side shield is connected to a frame, the frame is connected to a floor of a vehicle.

17. The seat assembly of claim 10 wherein the seat cushion includes a side surface positioned adjacent to the side shield.

18. The seat assembly of claim 17 wherein the trench is further defined as a generally horizontal momentary discontinuous surface extending into the side surface of the seat cushion, the leading edge of the side shield resting within the trench.

19. A seat assembly comprising:
   a seat frame;
   a side shield having an upper portion and an opposite bottom portion, the upper portion having a leading edge, the bottom portion attached to the seat frame; and
   a cushion portion, the cushion portion having a trench formed into the cushion portion, the trench permanently molded or cut into the seat cushion, the trench configured to connect to the side shield, the leading edge of the shield engaging the trench of the cushion portion thereby eliminating the gap between the shield portion and the cushion portion to provide an aesthetically appealing appearance to the user and to aid in installation of the shield during manufacturing.

20. The seat assembly of claim 19 wherein the trench is generally horizontally extending.

* * * * *